US012211644B2

(12) United States Patent
Wang et al.

(10) Patent No.: US 12,211,644 B2
(45) Date of Patent: Jan. 28, 2025

(54) OPTICAL SYSTEM

(71) Applicant: TDK TAIWAN CORP., Taoyuan (TW)

(72) Inventors: Chao-Hsi Wang, Taoyuan (TW);
Chao-Chang Hu, Taoyuan (TW);
Yueh-Lin Lee, Taoyuan (TW);
Che-Wei Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 183 days.

(21) Appl. No.: 17/971,280

(22) Filed: Oct. 21, 2022

(65) Prior Publication Data

US 2023/0131503 A1    Apr. 27, 2023

Related U.S. Application Data

(60) Provisional application No. 63/270,806, filed on Oct. 22, 2021.

(51) Int. Cl.
| | |
|---|---|
| *G02B 7/00* | (2021.01) |
| *G02B 7/02* | (2021.01) |
| *G02B 7/04* | (2021.01) |
| *G02B 7/08* | (2021.01) |
| *G02B 27/64* | (2006.01) |
| *G03B 9/14* | (2021.01) |
| *H01F 7/08* | (2006.01) |
| *H01F 7/16* | (2006.01) |
| *H04N 23/51* | (2023.01) |
| *H04N 23/54* | (2023.01) |
| *H04N 23/55* | (2023.01) |

(52) U.S. Cl.
CPC ............. *H01F 7/081* (2013.01); *G02B 7/008* (2013.01); *G02B 7/02* (2013.01); *G02B 7/023* (2013.01); *G02B 7/04* (2013.01); *G02B 7/08* (2013.01); *G02B 27/646* (2013.01); *G03B 9/14* (2013.01); *H01F 7/16* (2013.01); *H04N 23/51* (2023.01); *H04N 23/54* (2023.01); *H04N 23/55* (2023.01)

(58) Field of Classification Search
CPC . G02B 7/008; G02B 7/02; G03B 9/14; H04N 23/51
See application file for complete search history.

(56) References Cited

U.S. PATENT DOCUMENTS

| | | | |
|---|---|---|---|
| 11,520,140 B1 * | 12/2022 | Muramatsu | ............ G03B 17/55 |
| 2004/0062542 A1 * | 4/2004 | Watanabe | ................ G03B 9/14 396/463 |

(Continued)

FOREIGN PATENT DOCUMENTS

| | | | | |
|---|---|---|---|---|
| DE | 102012004909 A1 * | 9/2013 | ............. | G03B 17/55 |
| FR | 3079627 A1 * | 10/2019 | ............. | B60S 1/026 |

*Primary Examiner* — Christopher E Mahoney
(74) *Attorney, Agent, or Firm* — MUNCY, GEISSLER, OLDS & LOWE, P.C.

(57) ABSTRACT

An optical system is provided, including a housing, an optical element, a first movable part, a driving assembly, and a temperature adjusting module. The optical element is disposed on the housing. The first movable part is movably connected to the housing. The driving assembly is configured to drive the first movable part to move relative to the housing. The temperature adjusting module is disposed in the housing for adjusting the temperature of the optical system.

17 Claims, 12 Drawing Sheets

(56) References Cited

U.S. PATENT DOCUMENTS

| | | | |
|---|---|---|---|
| 2010/0053412 A1* | 3/2010 | Sekimoto | H04N 23/55 348/335 |
| 2013/0242150 A1* | 9/2013 | Wittenberg | H04N 23/55 396/452 |
| 2021/0124144 A1* | 4/2021 | Chen | G02B 7/08 |

* cited by examiner

OPTICAL SYSTEM

CROSS REFERENCE TO RELATED APPLICATIONS

This application claims the benefit of U.S. Provisional Application No. 63/270,806, filed Oct. 22, 2021, the entirety of which is incorporated by reference herein.

BACKGROUND OF THE INVENTION

Field of the Invention

The present invention relates to an optical system, and, in particular, to an optical system that has a temperature adjusting module.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, to reduce the size of the shutter or aperture mechanism in a camera module can be difficult. Moreover, the shutter or aperture mechanism may freeze when in the extreme low temperature environment. Therefore, addressing the aforementioned problems has become a challenge.

BRIEF SUMMARY OF THE INVENTION

An embodiment of the present invention provides an optical system that includes a housing, an optical element, a first movable part, a driving assembly, and a temperature adjusting module. The optical element is disposed on the housing. The first movable part is movably connected to the housing. The driving assembly is configured to drive the first movable part to move relative to the housing. Moreover, the temperature adjusting module is disposed in the housing for adjusting the temperature of the optical system.

In some embodiments, the housing has an opening, and light propagates through the opening along an optical axis of the optical element.

In some embodiments, the first movable part has a blade for partially or completely blocking the opening.

In some embodiments, the optical system further includes a second movable part movably connected to the housing, wherein the driving assembly forces the first and second movable parts to partially or completely block the opening.

In some embodiments, the optical system further includes a first thermal conductive element and a second thermal conductive element, wherein the first thermal conductive element is embedded in the housing, and the second thermal conductive element is embedded in the optical element.

In some embodiments, the first thermal conductive element has an L-shaped cross-section, and the second thermal conductive element has a longitudinal cross-section.

In some embodiments, the optical element is disposed in the opening.

In some embodiments, the first thermal conductive element has a Z-shaped cross-section, and the second thermal conductive element has an L-shaped cross-section.

In some embodiments, the optical element is disposed on a bottom side of the housing and located outside the opening.

In some embodiments, the diameter of the optical element is greater than the diameter of the opening.

In some embodiments, the optical system further includes a temperature sensor disposed in the housing, wherein the first and second thermal conductive elements are spaced apart from the temperature sensor.

In some embodiments, the optical system further includes a temperature sensor disposed in the housing, wherein the temperature adjusting module has a heating circuit, and the temperature sensor and the heating circuit do not overlap when viewed along an optical axis of the optical element.

In some embodiments, the temperature sensor and the heating circuit do not overlap when viewed in a direction perpendicular to the optical axis.

In some embodiments, the driving assembly has a coil and a rotor adjacent to the coil, the rotor is pivotally connected to the housing and has magnetic material, and the first movable part is movably connected to the rotor, wherein when a current signal is applied to the coil, the rotor rotates relative to the housing and impels the first movable part to move relative to the housing.

In some embodiments, the first movable part has a slot, and the rotor has a protrusion extending through the slot.

In some embodiments, the driving assembly further has a U-shaped yoke extending through the coil.

In some embodiments, the temperature adjusting module has a C-shaped structure.

In some embodiments, the temperature adjusting module has a first terminal, a second terminal, and a heating circuit connected to the first and second terminals, wherein the first and second terminals extend through the housing.

In some embodiments, the optical system further includes a temperature sensor, wherein the housing has a through hole receiving the temperature sensor.

In some embodiments, the optical system further includes a circuit board electrically connected to the temperature sensor, wherein the temperature sensor is covered by the circuit board.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
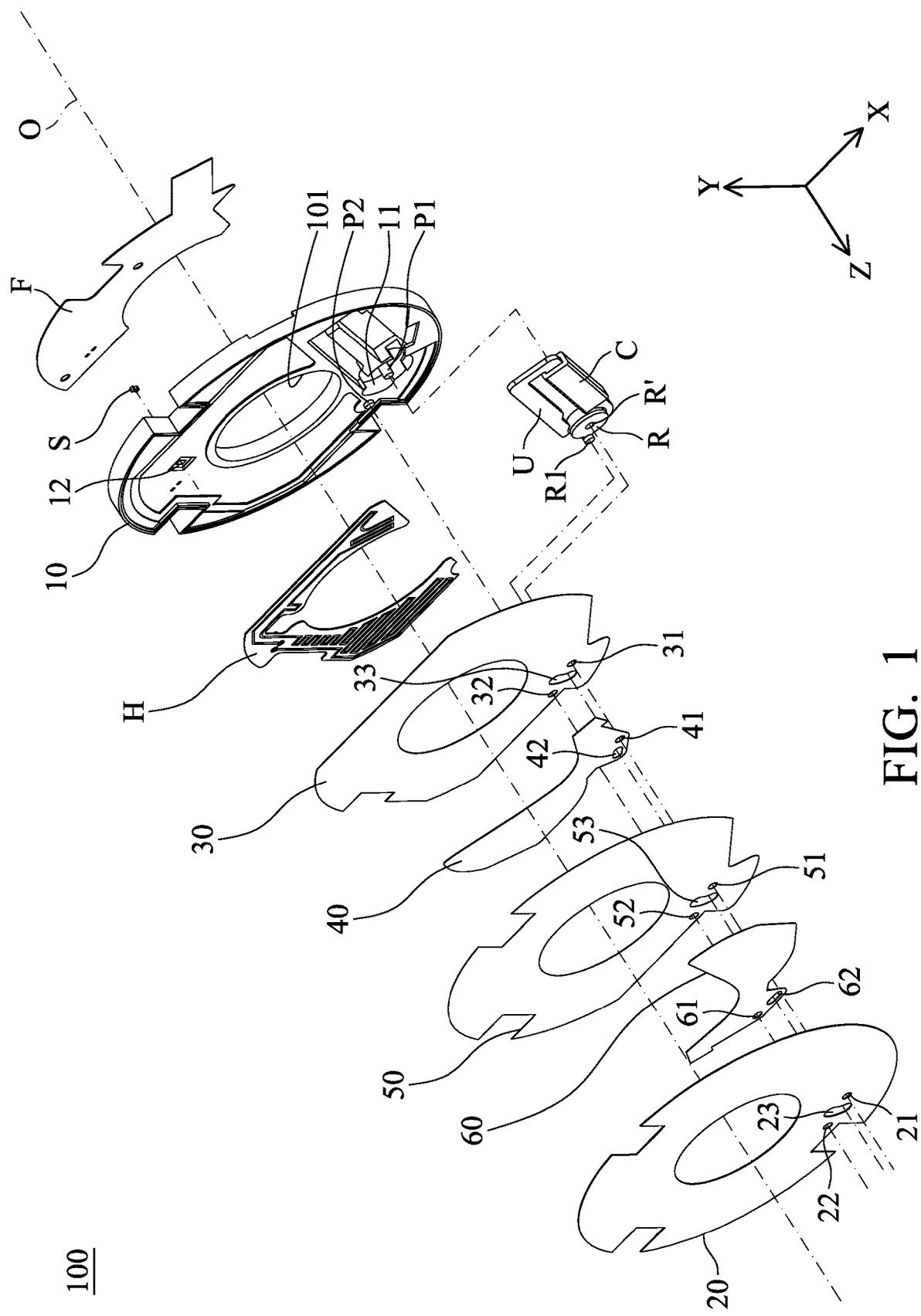
FIG. 1 is an exploded diagram of a driving mechanism 100, in accordance with an embodiment of the invention.
Figure 2:
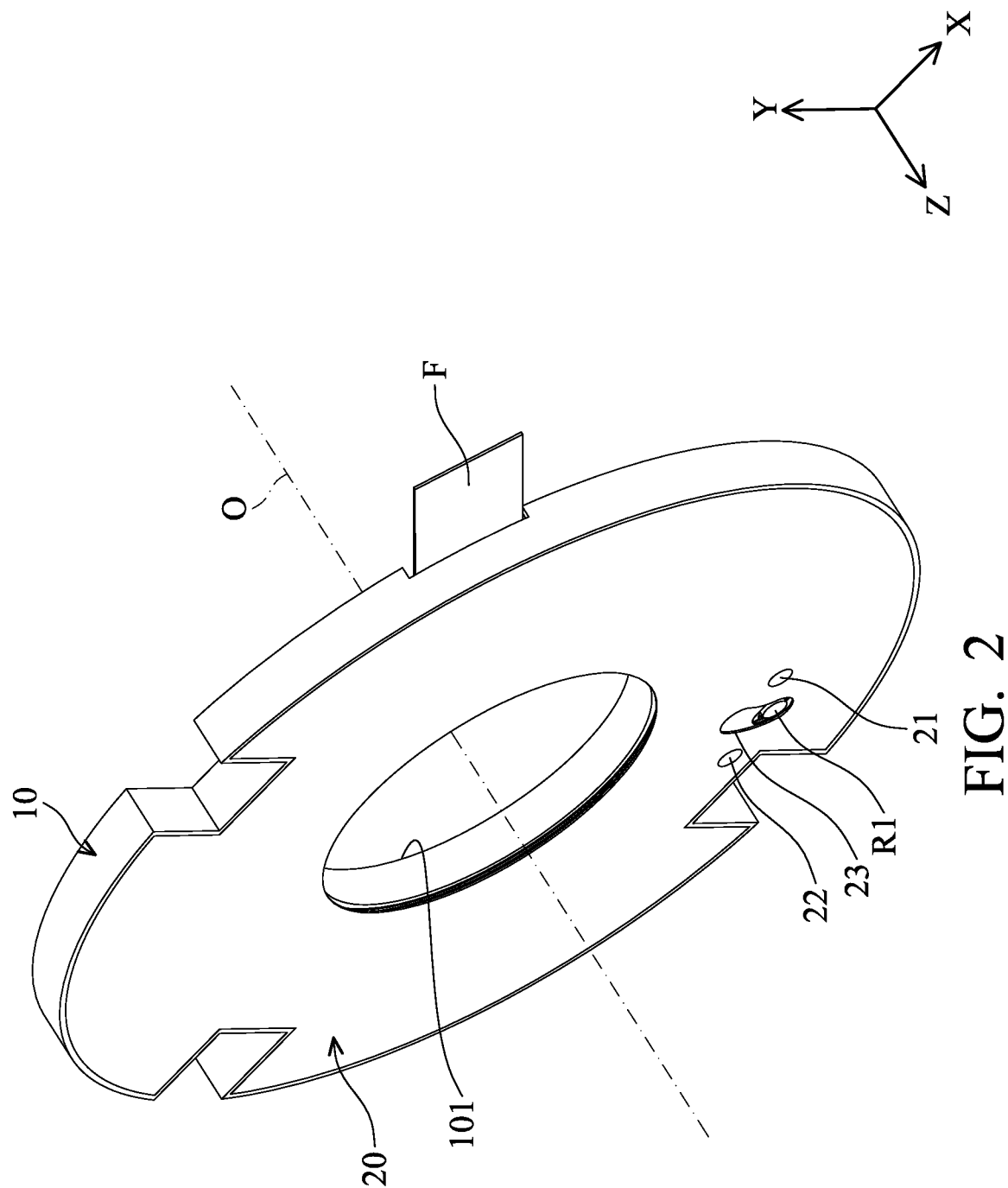
FIG. 2 is a perspective diagram of the driving mechanism 100 in FIG. 1 after assembly.
Figure 3:
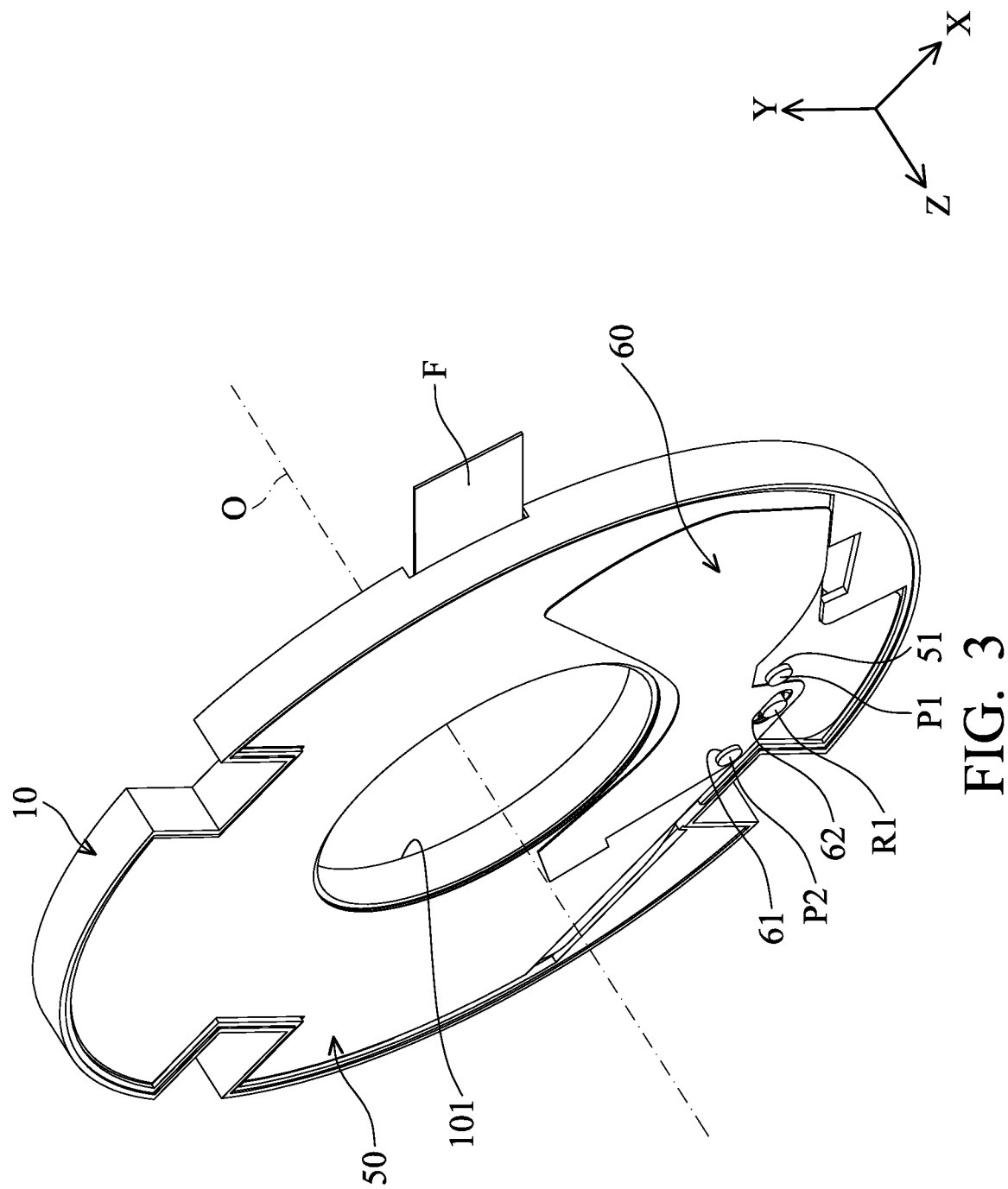
FIG. 3 is a perspective diagram of the driving mechanism 100 in FIG. 2 when the cover plate 20 is omitted.
Figure 4:
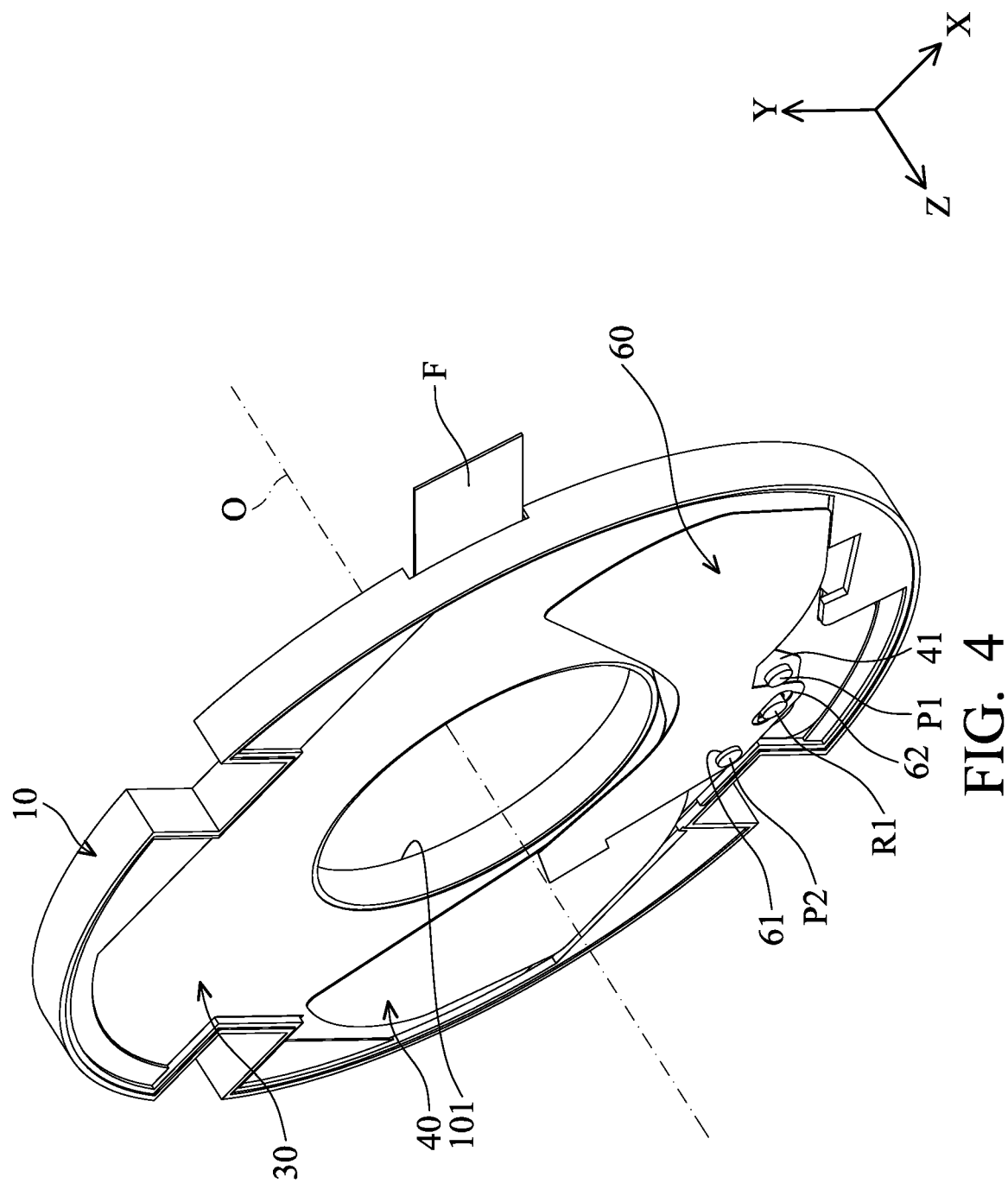
FIG. 4 is a perspective diagram of the driving mechanism 100 in FIG. 2 when the cover plate 20 and the second diaphragm 50 are omitted.
Figure 5:
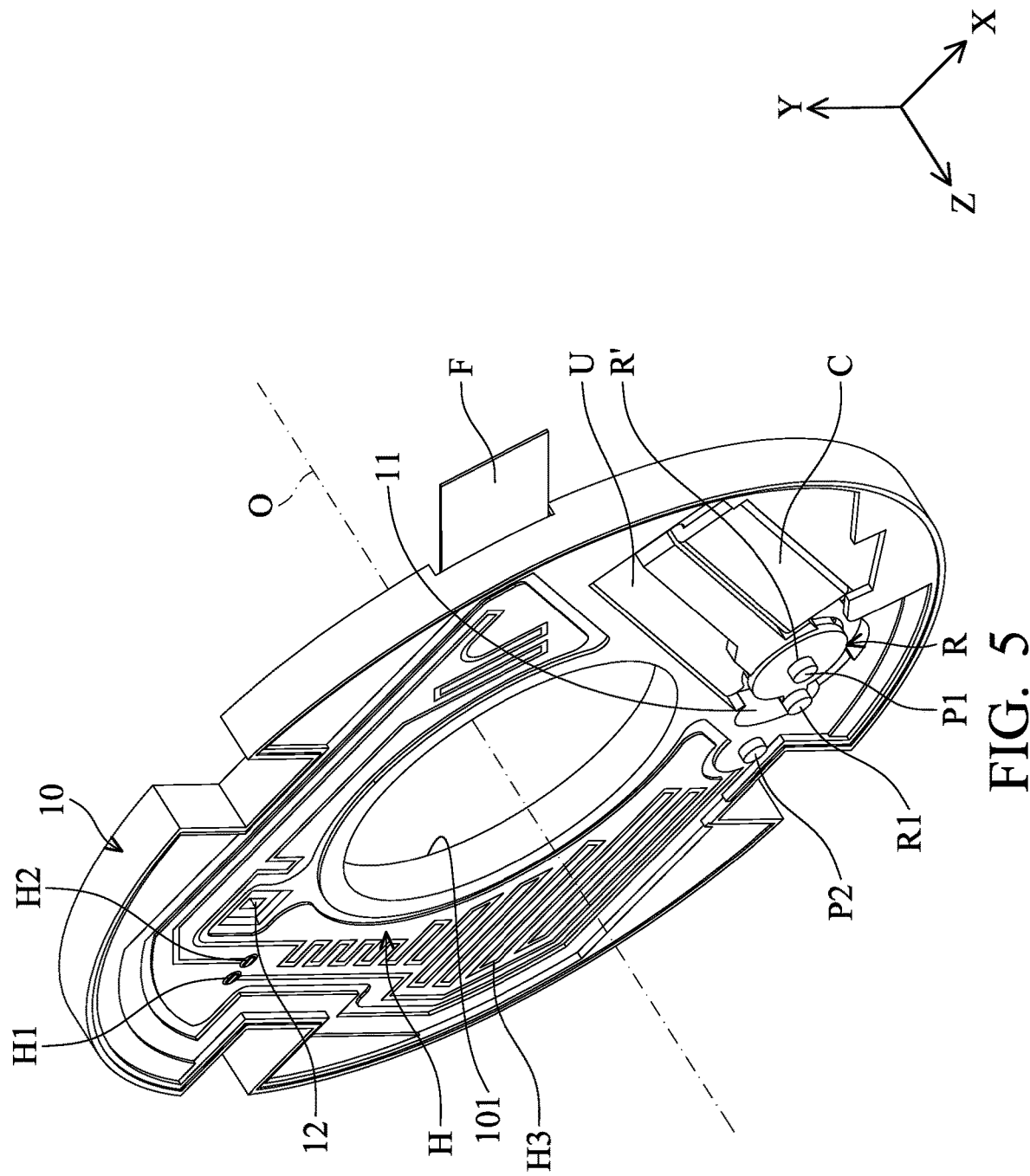
FIG. 5 is a perspective diagram showing the temperature adjusting module H, the rotor R, the coil C, and the yoke U received in the housing 10 of the driving mechanism 100.
Figure 6:
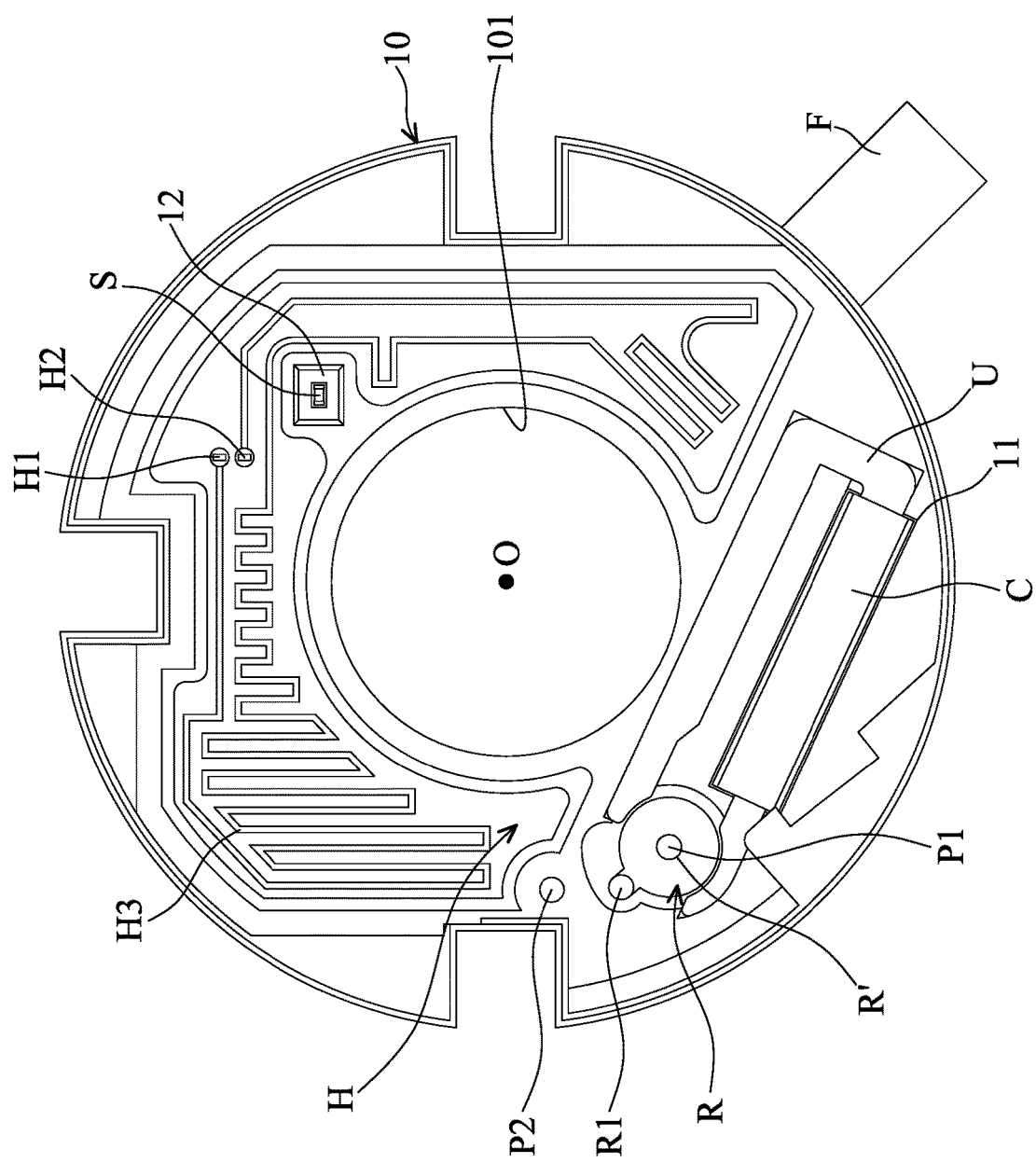
FIG. 6 is a front view of the temperature adjusting module H, the rotor R, the coil C, and the yoke U received in the housing 10 of the driving mechanism 100.

FIG. 1 is an exploded diagram of a driving mechanism 100, in accordance with an embodiment of the invention. FIG. 2 is a perspective diagram of the driving mechanism 100 in FIG. 1 after assembly. FIG. 3 is a perspective diagram of the driving mechanism 100 in FIG. 2 when the cover plate 20 is omitted. FIG. 4 is a perspective diagram of the driving mechanism 100 in FIG. 2 when the cover plate 20 and the second diaphragm 50 are omitted. FIG. 5 is a perspective diagram showing the temperature adjusting module H, the rotor R, the coil C, and the yoke U received in the housing 10 of the driving mechanism 100. FIG. 6 is a front view of the temperature adjusting module H, the rotor R, the coil C, and the yoke U received in the housing 10 of the driving mechanism 100.

Referring to FIGS. 1-6, the driving mechanism 100 may be disposed in a cell phone, laptop computer, or other electronic devices. In this embodiment, the driving mechanism 100 primarily comprises a housing 10, a cover plate 20, a first diaphragm 30, a first movable part 40, a second diaphragm 50, a second movable part 60, a temperature adjusting module H, a coil C, a yoke U, a rotor R, a temperature sensor S, and a circuit board F. The first and second diaphragms 30 and 50 are affixed in the housing 10. The first and second movable parts 40 and 60 are pivotally connected to the housing 10.

It should be noted that the driving mechanism 100 can be used as a shutter or aperture of a camera unit that is disposed in an electronic device. The first diaphragm 30, the first movable part 40, the second diaphragm 50, and the second movable part 60 are stacked in the housing 10, and the cover plate 20 is mounted to a side of the housing 10 for covering and protecting the components in the housing 10.

In some embodiments, the driving mechanism 100 may comprise only the first movable part 40, and the second movable part 60 is omitted from driving mechanism 100.

An optical element (e.g. optical lens) may be affixed in the opening 101 at the center of the housing 10. The driving mechanism 100 and the optical element can constitute an optical system, and light can propagate through the optical element in the opening 101 to an image sensor (not shown) along the optical axis O of the optical element, whereby a digital image can be generated. The first and second movable parts 40 and 60 may be blades of a shutter or aperture in a camera unit that can partially or completely block the opening 101 for controlling the quantity of light through the optical element.

It can be seen in FIGS. 1, 5, and 6 that the temperature adjusting module H, the rotor R, the coil C, and the yoke U are disposed in the housing 10. The rotor R, the coil C, and the yoke U are received in a through hole 11 of the housing 10, and the temperature sensor S is received in another through hole 12 of the housing 10 and electrically connected to the circuit board F on the outer side of the housing 10.

In some embodiments, the circuit board F may comprise a Flexible Printed Circuits (FPC), and the temperature sensor S may comprise a thermistor for detecting the temperature of the driving mechanism 100. When the driving mechanism 100 is in a low temperature state (e.g. under 0° C.), the temperature adjusting module H can be used to deice by heating the driving mechanism 100, thus preventing the components inside the housing 10 (e.g. the first and second movable parts 40 and 60) from sticking each other.

The yoke U has a U-shaped structure and extends through the coil C, and the rotor R comprises magnetic material (e.g. permanent magnet). In this embodiment, the housing 10 forms a first hinge P1 extending through a hole R' of the rotor R, whereby the rotor R is pivotally connected to the housing 10.

Still referring FIG. 1, the first hinge P1 sequentially extends through the hole 31 of the first diaphragm 30, the hole 41 of the first movable part 40, the hole 51 of the second diaphragm 50, and the hole 21 of the cover plate 20, whereby the first movable part 40 can rotate relative to the housing 10 around the first hinge P1.

Moreover, a second hinge P2 of the housing 10 sequentially extends through the hole 32 of the first diaphragm 30, the hole 52 of the second diaphragm 50, the hole 61 of the second movable part 60, and the hole 22 of the cover plate 20, whereby the second movable part 60 can rotate relative to the housing 10 around the second hinge P2.

Specifically, the rotor R forms a protrusion R1 that sequentially extends through the slot 33 of the first diaphragm 30, the slot 42 of the first movable part 40, the slot 53 of the second diaphragm 50, the slot 62 of the second movable part 60, and the slot 23 of the cover plate 20. When the rotor R rotates around the first hinge P1, the protrusion R1 can move within the slot 42 and 62, and the first and second movable parts 40 and 60 can be forced by the rotor R to respectively rotate around the first and second hinges P1 and P2.

It should be noted that the rotor R, the coil C, and the yoke U constitute a driving assembly of the driving mechanism 100. The coil C can be electrically connected to the circuit board F on the outer side of the housing 10 via conductive wires (not shown). When a current signal is applied to the coil C, the rotor R rotates around the first hinge P1, whereby the first movable part 40 is forced to rotate around the first hinge P1 via the protrusion R1 of the rotor R. Additionally, the rotor R can also impel the second movable part 60 to rotate around the second hinge P2 via the protrusion R1 of the rotor R. Therefore, the first and second movable parts 40 and 60 can be used as rotatable blades of a shutter or aperture in a camera unit.

As shown in FIGS. 1 and 5, the temperature adjusting module H in this embodiment may be a C-shaped circuit board that is perpendicular to the optical axis O. The temperature adjusting module H has a first terminal H1, a second terminal H2, and a heating circuit H3 connected to the first and second terminals H1 and H2.

Figure 7:
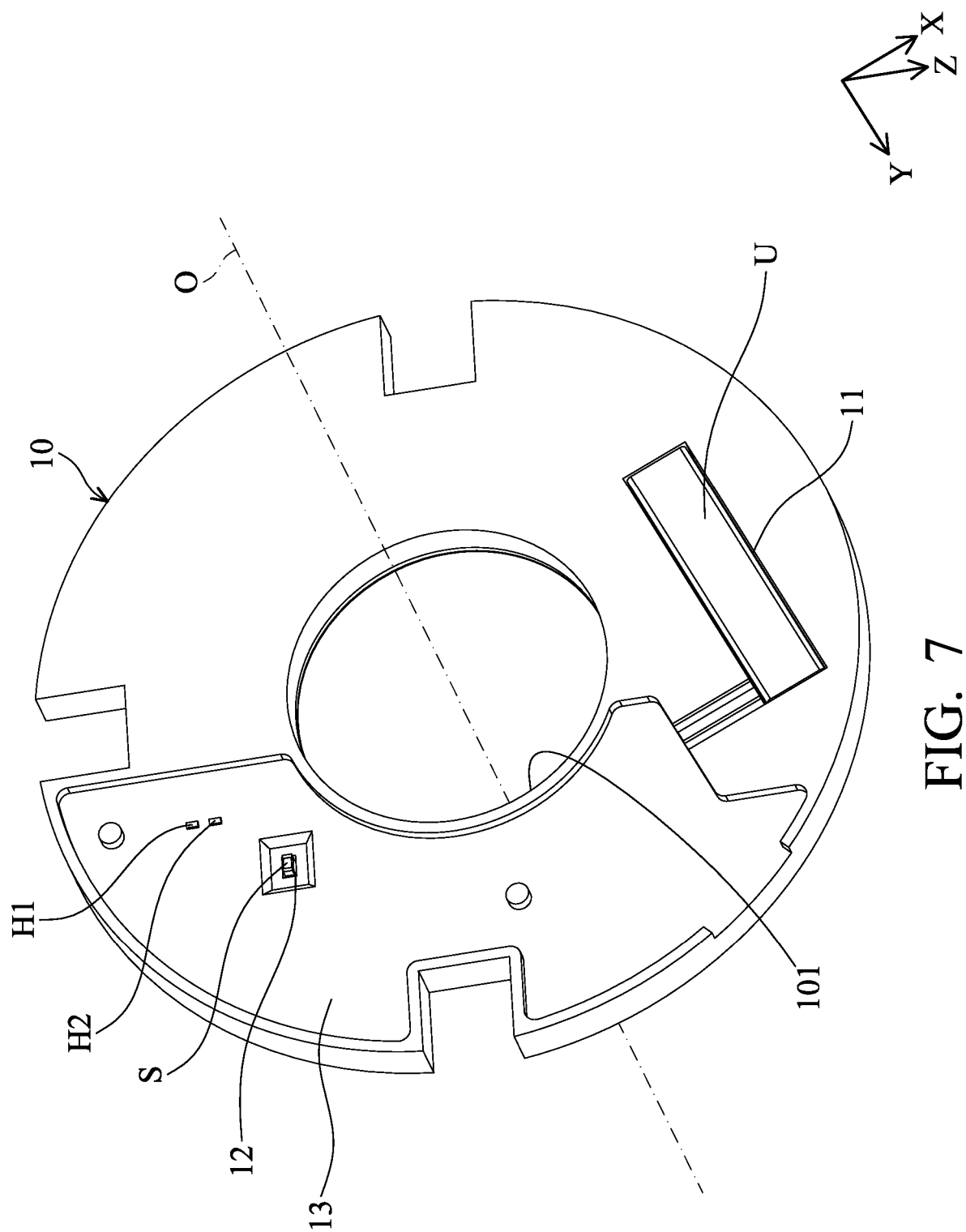
FIG. 7 is a perspective diagram showing the yoke U, the temperature sensor S, and the first and second terminals H1 and H2 of the temperature adjusting module H that are exposed to a rear side of the housing 10.
Figure 8:
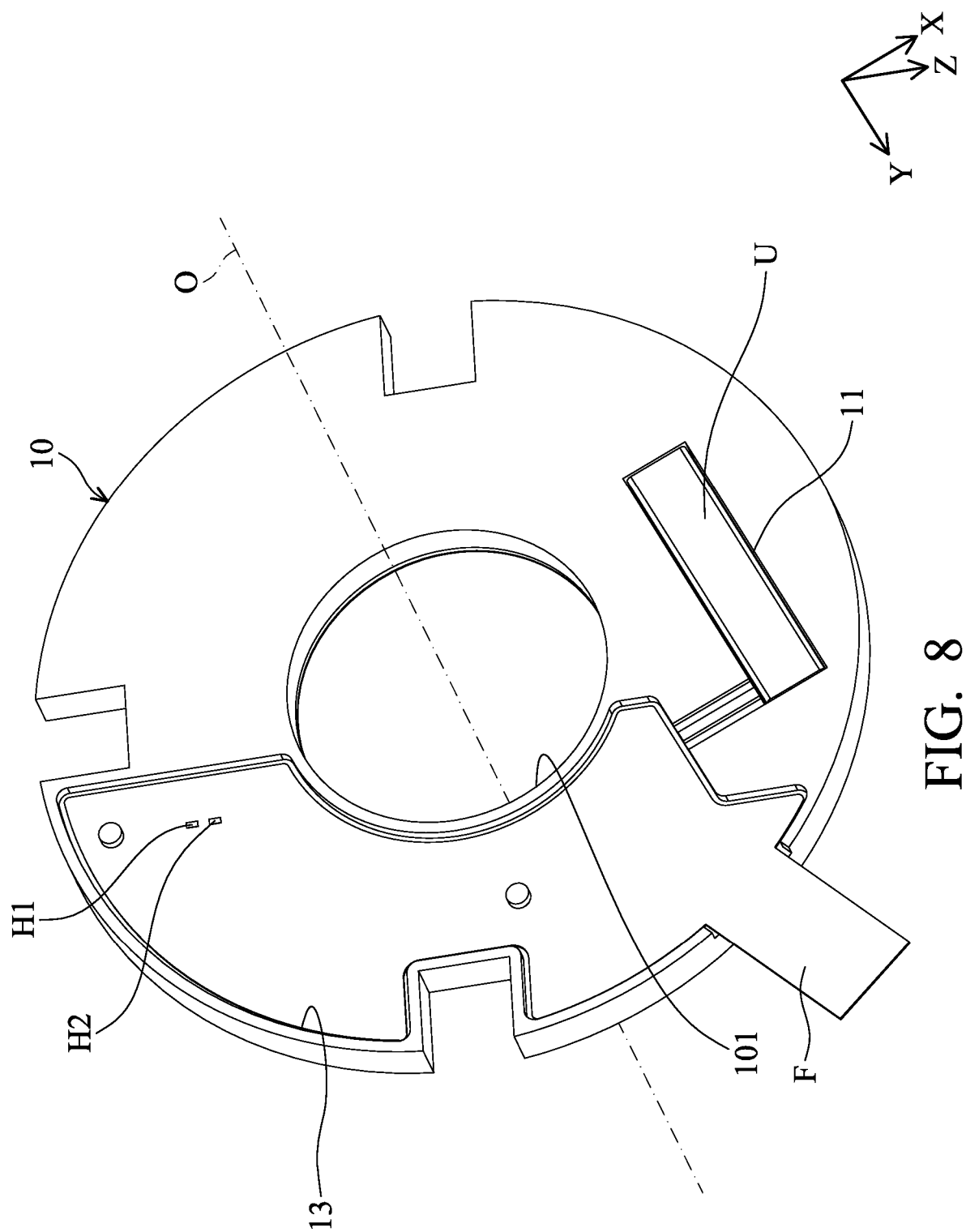
FIG. 8 is a perspective diagram showing the circuit board F received in a recess 13 of the housing 10.

FIG. 7 is a perspective diagram showing the yoke U, the temperature sensor S, and the first and second terminals H1 and H2 of the temperature adjusting module H that are exposed to a rear side of the housing 10. FIG. 8 is a perspective diagram showing the circuit board F received in a recess 13 of the housing 10.

Referring to FIGS. 6-8, the first and second terminals H1 and H2 extend through the housing 10 and are exposed to the rear side of the housing 10. The yoke U and the temperature sensor S are also exposed to the rear side of the housing 10 via the through holes 11 and 12.

A recess 13 is formed on the rear side of the housing 10 for receiving the circuit board F. After assembly of the driving mechanism 100, the circuit board F covers the temperature sensor S, and the first and second terminals H1 and H2 of the temperature adjusting module H extend through the circuit board F so that they are electrically connected to each other.

It should be noted that the temperature sensor S and the heating circuit H3 do not overlap when viewed along the optical axis O (Z axis). Additionally, the temperature sensor S and the heating circuit H3 do not overlap when viewed in a direction (X or Y direction) that is perpendicular to the optical axis O.

Figure 9:
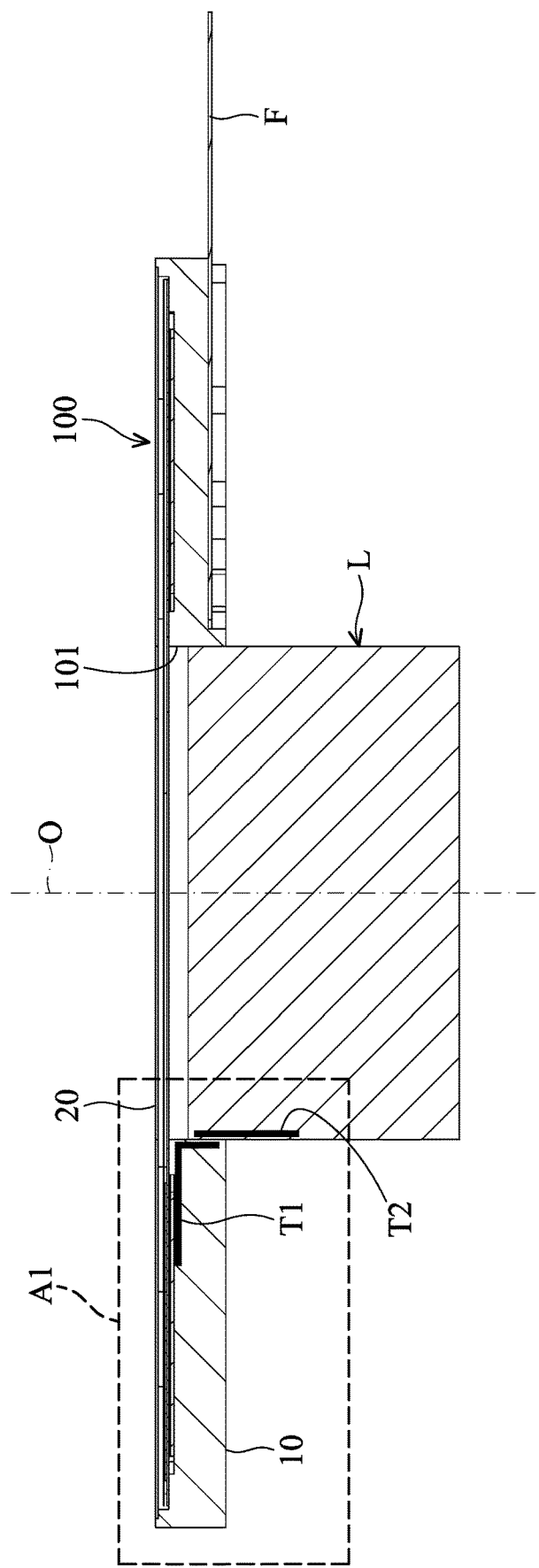
FIG. 9 is a cross-sectional view of a first thermal conductive element T1 embedded in the housing 10 and a second thermal conductive element T2 embedded in the optical element L, in accordance with another embodiment of the invention.
Figure 10:
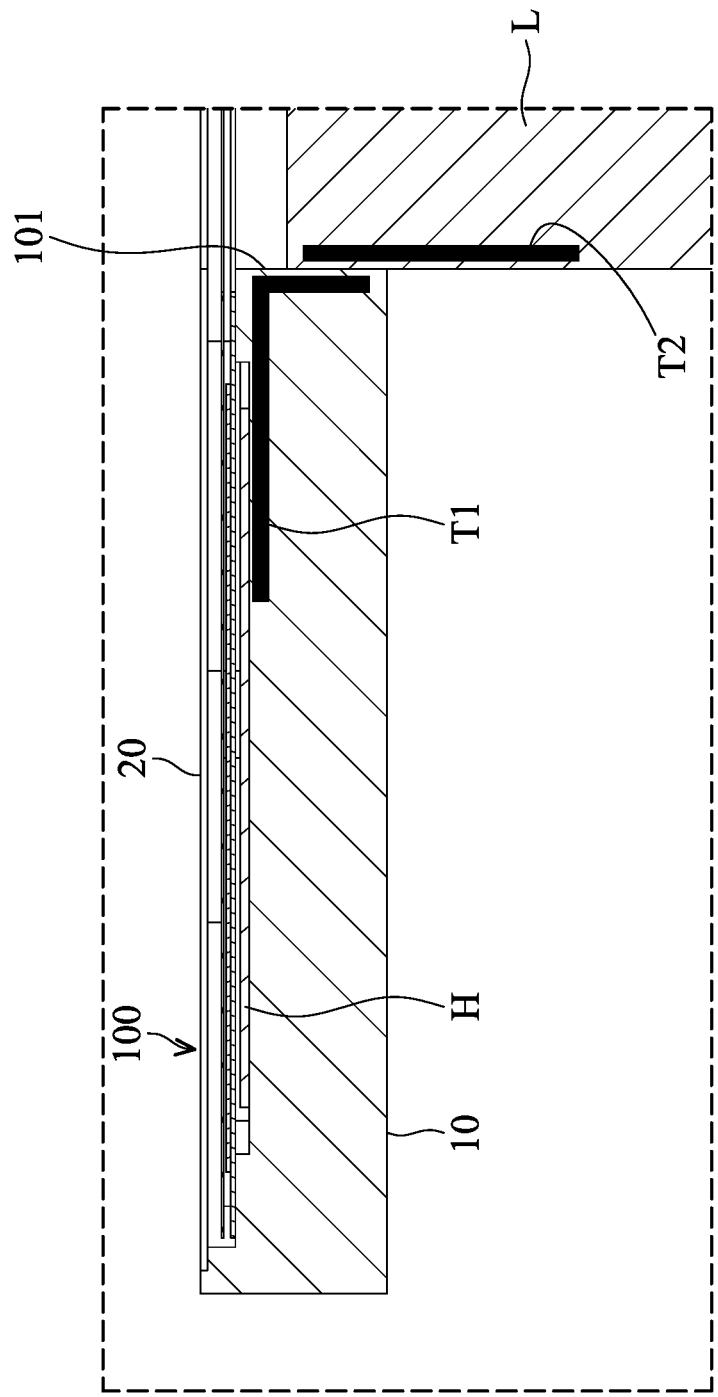
FIG. 10 is an enlarged view of the portion A1 in FIG. 9.

FIG. 9 is a cross-sectional view of a first thermal conductive element T1 embedded in the housing 10 and a second thermal conductive element T2 embedded in the optical element L, in accordance with another embodiment of the invention. FIG. 10 is an enlarged view of the portion A1 in FIG. 9.

Referring to FIGS. 9 and 10, in another embodiment, an optical element L (e.g. optical lens) is secured in the opening 101 of the housing 10, wherein the optical element L and the driving mechanism 100 can constitute an optical system.

Specifically, a first thermal conductive element T1 is embedded in the housing 10, and a second thermal conductive element T2 is embedded in the optical element L. The first and second thermal conductive elements T1 and T2 may comprise metal and are spaced apart from the temperature sensor S.

In this embodiment, the first thermal conductive element T1 has an L-shaped cross-section, and it may be located close to or contact the temperature adjusting module H. The second thermal conductive element T2 has a longitudinal cross-section, and it may be located close to or contact the first thermal conductive element T1.

Heat generated by the heating circuit H3 can transfer through the first and second thermal conductive elements T1 and T2 to the optical element L. Thus, the optical element L can be heated to ensure the temperature in the range from 10° C. to 85° C.

Figure 11:
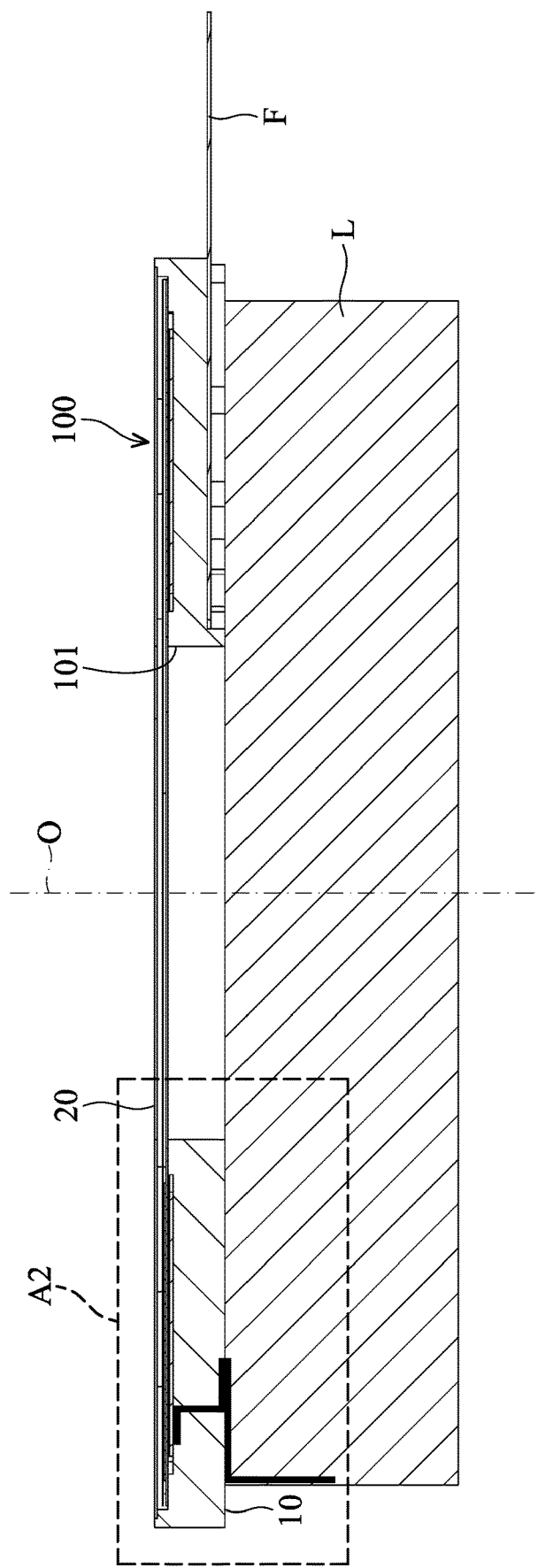
FIG. 11 is a cross-sectional view of a first thermal conductive element T1 embedded in the housing 10 and a second thermal conductive element T2 embedded in the optical element L, in accordance with another embodiment of the invention.
Figure 12:
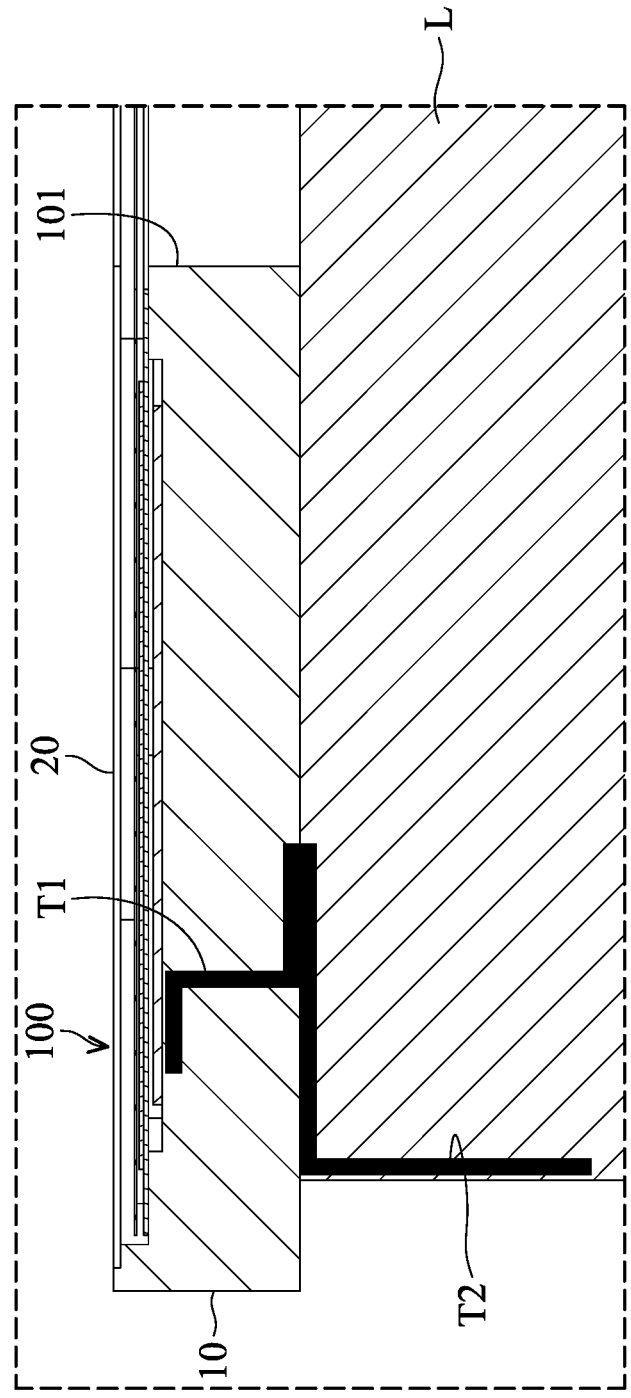
FIG. 12 is an enlarged view of the portion A2 in FIG. 11.

FIG. 11 is a cross-sectional view of a first thermal conductive element T1 embedded in the housing 10 and a second thermal conductive element T2 embedded in the optical element L, in accordance with another embodiment of the invention. FIG. 12 is an enlarged view of the portion A2 in FIG. 11.

Referring to FIGS. 11 and 12, in another embodiment, an optical element L (e.g. optical lens) is affixed to the bottom side of the housing 10, wherein the optical element L and the driving mechanism 100 can constitute an optical system, and the optical element L is located outside the opening 101.

Specifically, the diameter of the optical element L is greater than the diameter of the opening 101. The first thermal conductive element T1 is embedded in the housing 10, and the second thermal conductive element T2 is embedded in the optical element L. The first and second thermal conductive elements T1 and T2 may comprise metal and are spaced apart from the temperature sensor S.

In this embodiment, the first thermal conductive element T1 has a Z-shaped cross-section, and it may be located close to or contact the temperature adjusting module H. The second thermal conductive element T2 has an L-shaped cross-section, and it may be located close to or contact the first thermal conductive element T1.

It should be noted that heat generated by the heating circuit H3 can transfer through the first and second thermal conductive elements T1 and T2 to the optical element L. Therefore, the optical element L can be heated to ensure the temperature in the range from 10° C. to 85° C.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical system, comprising:
a housing having an opening;
an optical element, disposed on the housing, wherein light propagates through the opening along an optical axis of the optical element;
a first movable part, movably connected to the housing;
a first thermal conductive element embedded in the housing;
a second thermal conductive element embedded in the optical element;
a driving assembly, configured to drive the first movable part to move relative to the housing; and
a temperature adjusting module, disposed in the housing for adjusting a temperature of the optical system.

2. The optical system as claimed in claim 1, wherein the first movable part comprises a blade for partially or completely blocking the opening.

3. The optical system as claimed in claim 1, further comprising a second movable part movably connected to the housing, wherein the driving assembly forces the first movable part and the second movable part to partially or completely block the opening.

4. The optical system as claimed in claim 1, wherein the first thermal conductive element has an L-shaped cross-section, and the second thermal conductive element has a longitudinal cross-section.

5. The optical system as claimed in claim 4, wherein the optical element is disposed in the opening.

6. The optical system as claimed in claim 1, wherein the first thermal conductive element has a Z-shaped cross-section, and the second thermal conductive element has an L-shaped cross-section.

7. The optical system as claimed in claim 6, wherein the optical element is disposed on a bottom side of the housing and located outside the opening.

8. The optical system as claimed in claim 7, wherein a diameter of the optical element is greater than a diameter of the opening.

9. The optical system as claimed in claim 1, further comprising a temperature sensor disposed in the housing, wherein the first and second thermal conductive elements are spaced apart from the temperature sensor.

10. The optical system as claimed in claim 1, wherein the driving assembly has a coil and a rotor adjacent to the coil, the rotor is pivotally connected to the housing and comprises a magnetic material, and the first movable part is movably connected to the rotor, wherein when a current signal is applied to the coil, the rotor rotates relative to the housing and impels the first movable part to move relative to the housing.

11. The optical system as claimed in claim 10, wherein the first movable part has a slot, and the rotor has a protrusion extending through the slot.

12. The optical system as claimed in claim 10, wherein the driving assembly further has a U-shaped yoke extending through the coil.

13. The optical system as claimed in claim 1, wherein the temperature adjusting module has a first terminal, a second terminal, and a heating circuit connected to the first terminal and the second terminal, wherein the first terminal and second terminal extend through the housing.

14. An optical system, comprising:
a housing;
an optical element, disposed on the housing;
a first movable part, movably connected to the housing;
a driving assembly, configured to drive the first movable part to move relative to the housing;
a temperature adjusting module, disposed in the housing for adjusting a temperature of the optical system, wherein the temperature adjusting module has a heating circuit; and
a temperature sensor disposed in the housing, wherein the temperature sensor and the heating circuit do not overlap when viewed along an optical axis of the optical element and in a direction perpendicular to the optical axis.

15. An optical system, comprising:
a housing;
an optical element, disposed on the housing;
a first movable part, movably connected to the housing;
a driving assembly, configured to drive the first movable part to move relative to the housing; and
a temperature adjusting module, disposed in the housing for adjusting a temperature of the optical system, wherein the temperature adjusting module has a C-shaped structure.

16. An optical system, further comprising:
a housing;
an optical element, disposed on the housing;
a first movable part, movably connected to the housing;
a driving assembly, configured to drive the first movable part to move relative to the housing;
a temperature adjusting module, disposed in the housing for adjusting a temperature of the optical system; and
a temperature sensor, wherein the housing has a through hole receiving the temperature sensor.

17. The optical system as claimed in claim 16, further comprising a circuit board electrically connected to the temperature sensor, wherein the temperature sensor is covered by the circuit board.

* * * * *